Dec. 9, 1947.   H. HACKLANDER   2,432,412
BONDING MACHINE
Filed March 5, 1945   4 Sheets-Sheet 2

Inventor
Hans Hacklander
By William T. Stewart
Attorney

Witness:
Godfrey Pecina

Dec. 9, 1947.  H. HACKLANDER  2,432,412
BONDING MACHINE
Filed March 5, 1945  4 Sheets-Sheet 3

Inventor
Hans Hacklander
By William F. Stewart
Attorney

Witness:
Godfrey Pecina

Dec. 9, 1947.  H. HACKLANDER  2,432,412
BONDING MACHINE
Filed March 5, 1945  4 Sheets-Sheet 4
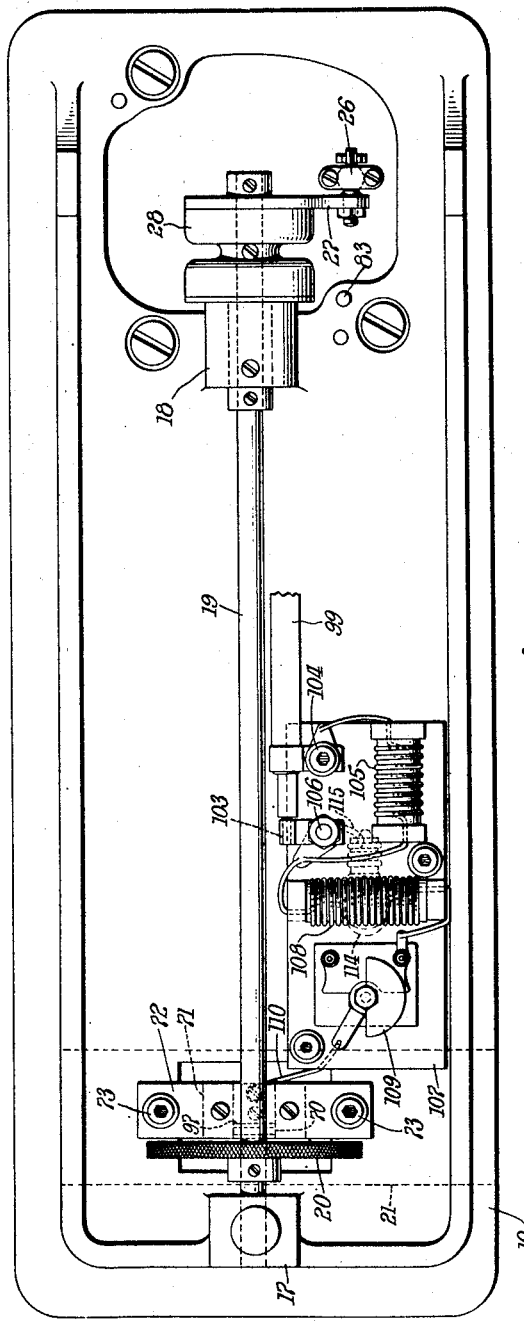
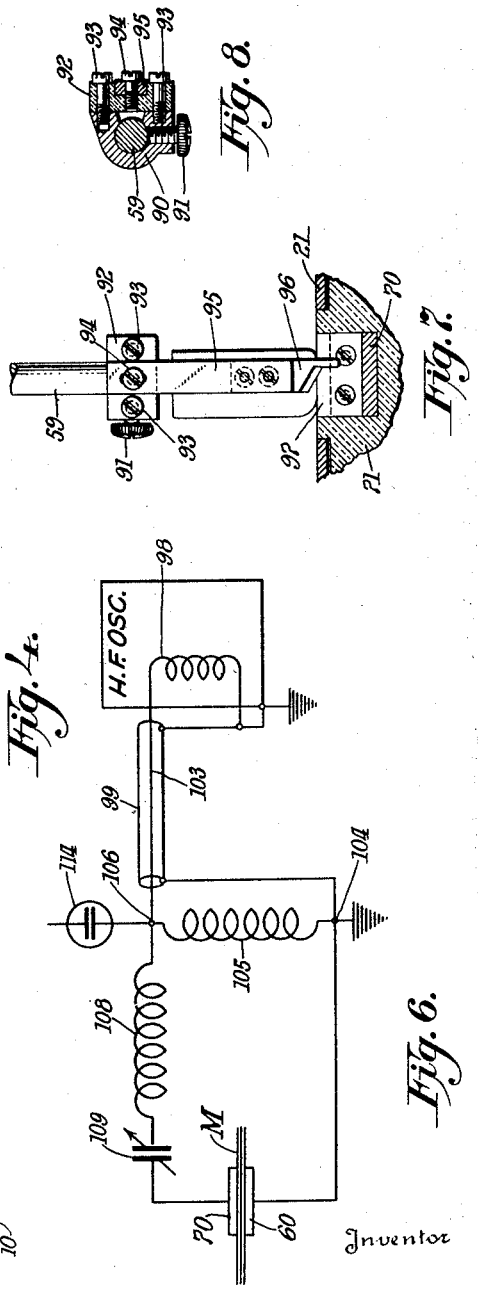
Inventor
Hans Hacklander
By William F. Stewart
Attorney
Witness:
Godfrey Pecina Patented Dec. 9, 1947

2,432,412

UNITED STATES PATENT OFFICE 2,432,412

BONDING MACHINE

Hans Hacklander, Linden, N. J., assignor to The Singer Manufacturing Company, Elizabeth, N. J., a corporation of New Jersey Application March 5, 1945, Serial No. 581,074

8 Claims. (Cl. 154—42)

This invention relates to machines for bonding together plies of dielectric materials by the use of high frequency electric currents.

One of the objects of this invention is to provide electrodes supplied with high frequency electric current to establish a bonding zone and improved feeding means for advancing the material through said zone.

Another object of this invention is to provide improved means for actuating one of the electrodes into and out of engagement with the material and to provide a single manual means for simultaneously moving one of the electrodes and an element of the feeding mechanism out of engagement with the material.

Another object of this invention is to provide improved means for regulating the rate of feed of the material through the bonding zone.

Another object of this invention is to provide a reciprocatory electrode with means for positively moving the electrode in a direction away from the material and for yieldingly urging the electrode into engagement with the material.

A still further object of this invention is to provide means for concurrently feeding, bonding and trimming edges of superposed plies of material.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a vertical section taken through the center of a machine embodying the invention, the operative parts being shown in elevation.

Fig. 4 is a bottom plan view of the machine shown in Fig. 1.

Fig. 6 is a schematic wiring diagram showing the electrical connections between the high frequency oscillator and the electrodes of the machine.

Figs. 7 and 8 are detailed views of the trimming mechanism.

Figure 1:
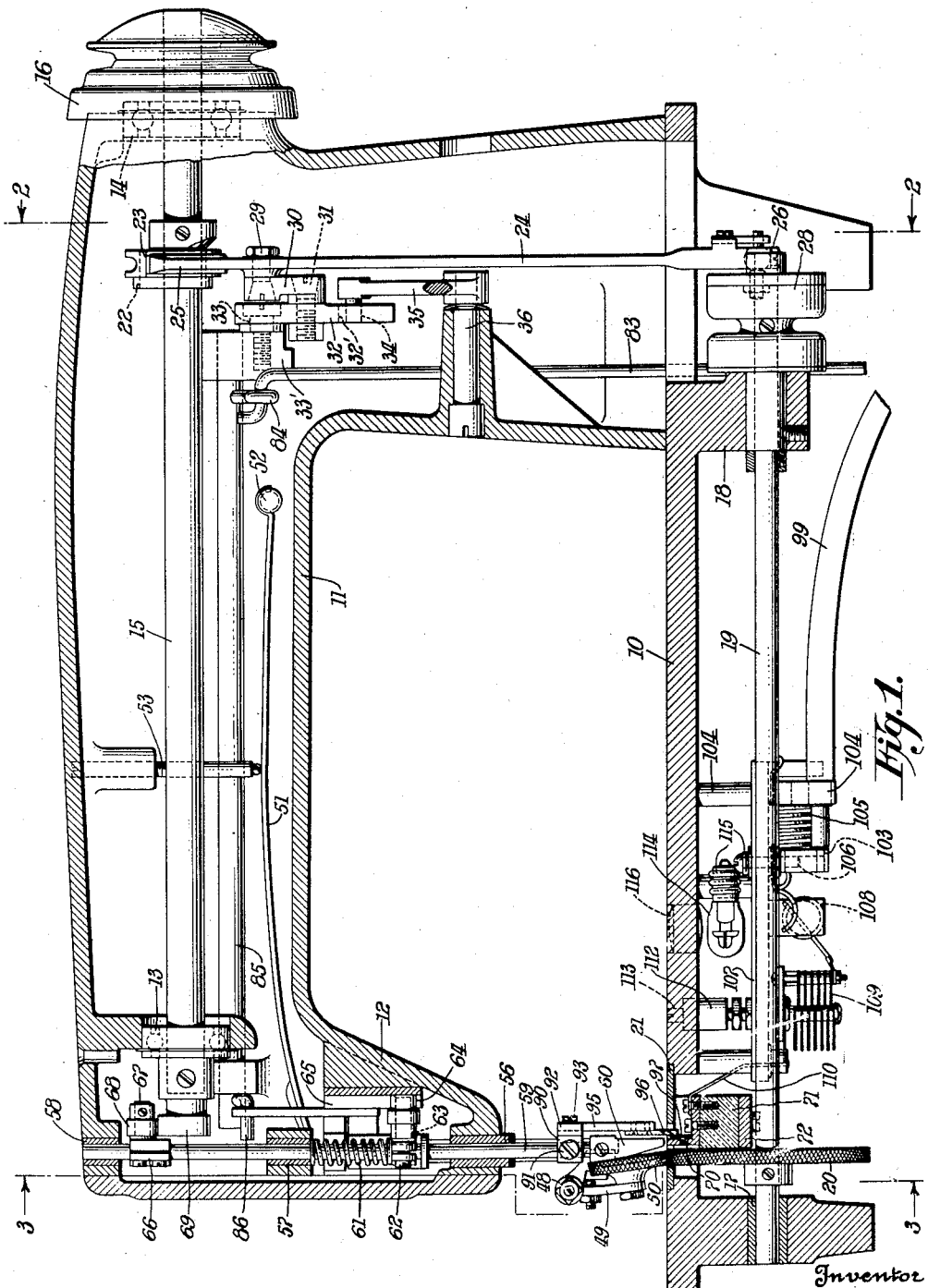

In the embodiment of this invention selected for illustration, my improved bonding machine has a frame comprising a bed 10 carrying an overhanging bracket-arm 11 terminating in a hollow head 12. Journaled in bearings 13 and 14 in the bracket-arm 11 is a main shaft 15 having a combined pulley and handwheel 16 secured to its outboard end. The pulley 16 may be connected by any suitable means to a source of power for the purpose of rotating the shaft 15. Journaled beneath the bed 10, in the bearings 17 and 18, is a second shaft 19 arranged parallel with the main shaft 15, and secured to the shaft intermediate its bearings is a feed wheel 20, the periphery of which extends through a suitable slot in a plate 21 carried by the bed 10.

The rotary shaft 15 imparts intermittent step by step rotary movement to the shaft 19 through mechanism comprising an eccentric 22 secured upon the main shaft 15, a block 23 surrounding the eccentric, and a connecting rod 24 having its upper forked end 25 engaging the sides of the block 23 and its lower end pivotally connected, at 26, to a laterally extending arm 27, of a one way clutch 28, which is secured upon the outboard end of the shaft 19. The clutch 28 is the same as that disclosed in my U. S. Patent No. 2,277,971 of March 31, 1942, to which reference may be had for a detailed description of the internal mechanism of the clutch.

Figures 2, 9:
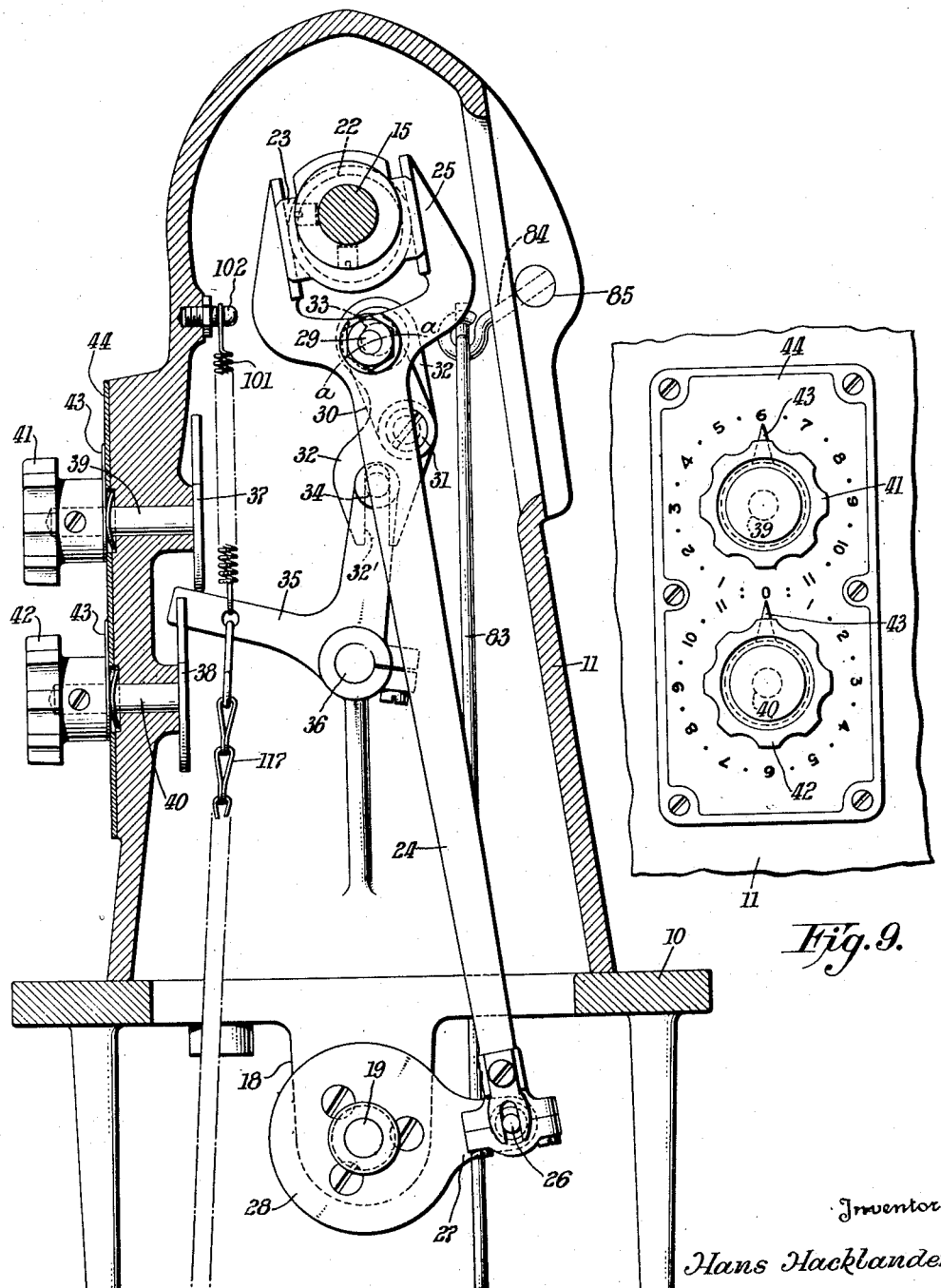
Fig. 2 is a vertical section taken along the line 2—2 of Fig. 1.
Fig. 9 is a detailed view of the manual means by which the operator may predetermine the rates of feed of the machine.
Figures 3, 5:
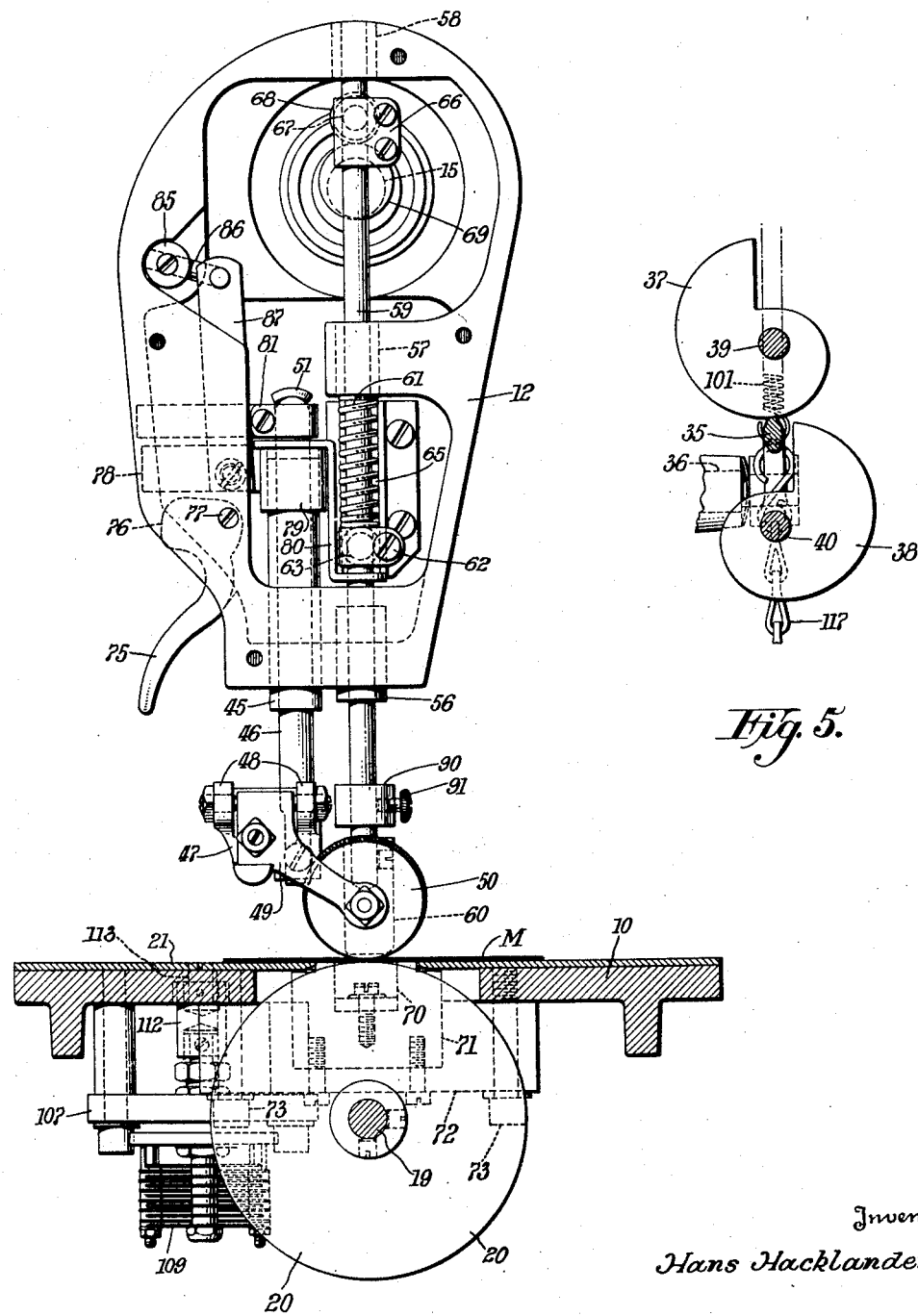
Fig. 3 is a vertical section taken substantially along the line 3—3 of Fig. 1.
Fig. 5 is a detailed view of the cam means for controlling the feed regulator.

Adjacent its upper end, the connecting rod 24 has pivotally connected to it, at 29, one end of an anchor link 30, the other end of which is pivotally connected at 31 to a normally stationary crank-arm 32, fulcrumed on a shouldered screw 33, threaded into a bearing boss 33', formed on the bracket-arm 11. The free end of the crank-arm 32 is provided with an open ended slot 32', which receives a pin 34, carried by one arm of a feed-regulating bell-crank lever 35, journaled on a stud 36, carried by the bracket-arm 11. The other arm of the bell-crank lever 35 extends laterally to a point between spaced cams 37 and 38, carried by the ends of parallel stub shafts 39 and 40, which extend through suitable bearing bosses formed on the bracket-arm 11. Each of the shafts 39 and 40 have secured to the end protruding from the bracket-arm knobs 41 and 42, respectively, each of which carries a pointer 43 which together with suitable indicia provided on the plate 44 indicate the positions of the cams 37 and 38. A tension spring 101 has one of its ends anchored to a stud 102 carried by the frame of the machine and its other end secured to the arm of the bell-crank lever 35, which extends between the cams 37 and 38. This spring urges the bell-crank lever 39 in a clockwise direction (as viewed in Fig. 2) about its pivot 36 and thus constantly urges this end of the bell crank lever against the upper cam 37.

From the above, it will be understood that an oscillatory movement is imparted to the arm 27 of the clutch 28 by the horizontal movements of the block 23, which is actuated by the eccentric 22. This horizontal back and forth movement of the block 23 causes the connecting rod 24 to swing about its pivot 26. Due to the connection of the anchor link 30 to the connecting rod 24 and to the normally fixed pivot 31, this swinging movement of the connecting rod causes the pivot point 29 to move in an arcuate path indicated by the dotted line $a$—$a$ in Fig. 2. This movement in turn causes endwise movement of the connecting rod 24 thereby imparting, through the arm 27 and one way clutch 28, a step-by-step intermittent rotary motion to the shaft 19.

The amount of endwise movement given to the connecting rod 24 and consequently the amount of angular movement given the shaft 19 and feed-wheel 20 for each rotation of the main shaft 15, is dependent upon the angular position of the anchor-link 30. This position may be changed by shifting the feed-regulating bell-crank lever 35 about its pivot 36, thereby shifting the position of the normally stationary crank-arm 32 about its fulcrum screw 33. It will be obvious that, as the anchor-link 30 approaches its vertical position, the endwise movement of the connecting-rod decreases and, consequently, the angular movement of the feed-wheel 20 decreases for each rotation of the main shaft 15.

It will be observed that the spring 101 constantly urges the free end of the feed-regulating lever 35 upwardly into engagement with the periphery of the cam 37 and it will be apparent that the position of the cam 37 will determine the position of the feed-regulating lever 35. Consequently, the angular movement of the feed-wheel 20 for each rotation of the main shaft may be determined by turning the knob 41 and cam 37 until the wheel 20 operates at the desired speed.

Journaled in a bearing 45 carried by the hollow-head 12 is a vertically disposed bar 46 having secured to its lower end a bracket 47 formed with ears 48. Pivoted between the ears 48 of the bracket is an arm 49 having an upper feed-wheel 50 rotatably carried at its free end. The upper feed-wheel 50 is inclined at an angle to the vertical and its periphery is adapted to overlie and cooperate with the lower feed-wheel 20 to advance the material M. The bar 46 is constantly urged downwardly by a flat spring 51, the ends of which bear upon the top of the bar 46 and the stud 52. An adjusting screw 53 is located intermediate the ends of the spring for the purpose of varying its tension. This spring 51, through the bar 46, functions resiliently to urge the top feed-wheel 50 into engagement with the lower feed-wheel 20 to yieldingly grip the material therebetween.

The hollow-head 12 is provided with vertically alined bearings 56, 57 and 58 in which an endwise reciprocatory bar 59 is journaled. The bar 59 carries an electrode 60 at its lower end and is urged downwardly by a coiled compression spring 61 which encircles the bar 59 and reacts between the bearing 57 and a split collar 62 adjustably clamped to the bar 59. The split collar 62 carries a laterally extending pin 63 having on its free end a roller 64 which is located in a guideway 65 formed in the head of the machine. This construction prevents the bar 59 from turning in its bearings. Clamped to the bar 59 between the bearing 57 and 58 is a split collar 66 carrying a laterally extending pin 67 having a roller 68 journaled thereon. The roller 68 is located above and cooperates with an eccentric 69 fixed on the end of the main shaft 15. From the above, it will be understood that when the shaft 15 is rotated the eccentric 69 will engage the roller 68 and raise the bar 59 against the action of the spring 61 through a part of each revolution of the shaft, and will then move away from the roller and permit the spring 61 to force the bar 59 downwardly into engagement with the material M during the remaining portion of the revolution.

The upper electrode 60 cooperates with a lower electrode 70 located below the bed 10 of the machine. The electrode 70 is L-shaped in cross-section and is secured upon a block of insulating material 71 which is carried by a U-shaped strap 72 fixed to the underside of the bed 10 by the screws 73.

In order to simultaneously raise the presser roller 20 and upper electrode 60 from the material M, a hand lever 75 having a cam portion 76 is pivoted at 77 to the head 12 of the machine. When the lever 75 is raised, the cam portion 76 engages and lifts a laterally extending arm 78 of a collar 79, which slidably embraces the upper portion of the bearing sleeve 45. This upward motion of the collar 79 is transmitted to the electrode carrying bar 59 by means of a Z-shaped member 80 which is adapted to engage the collar 62 and move the bar 59 upwardly against the action of the spring 61. The collar 79 in its upward movement engages a second collar 81 clamped to the upper end of the presser-bar 46 and moves the bar 46 upwardly against the action of the flat spring 51. The feed-roller 50 and electrode bar 59 may also be raised by a treadle or knee shift lever. This means comprises a pull-rod 83, the lower end of which may be connected to a treadle (not shown) and the upper end connected to an arm 84 fixed to one end of a rock-shaft 85 journaled in the bracket-arm 11 and arranged parallel to the main shaft 15. To the other end of the rock-shaft 85 there is fixed an arm 86 which is connected by a link 87 to the arm 78 of the slidable collar 79.

It is often desirable to bond plies of material together and simultaneously trim the edges. To this end, trimmer mechanism which may be moved from operative to inoperative position has been provided. The trimmer mechanism comprises a collar 90 adjustably secured to the reciprocable bar 59 by a screw 91. The collar 90 has a block 92 of insulating material secured to it by the screws 93 and fixed to the insulating block 92 by the screw 94 is a depending shank 95 carrying a trimmer knife 96 at its lower end. The knife 96 cooperates with a ledger blade 97 secured to the lower electrode 70. As the electrode 70 is adjustably secured for lateral movement to the insulating block 71, the ledger blade 97 may be adjusted so that the knife 96 is placed under a slight lateral tension.

It is well known that, when dielectric material is subjected to a high frequency electric field, heat is generated in the material due to dielectric losses. In order to provide a high frequency field between the electrodes 60 and 70 a conventional high frequency electron tube generator or oscillator operating at a frequency of from 30 to 100 megacycles is provided. As shown in Fig. 6, the output coupling coil 98 of a high frequency oscillator has one of its ends electrically connected to one end of the outer conductor 99 of a coaxial transmission line, and its other end electrically connected to the inner conductor 103.

The outer conductor 99 of the transmission line is grounded at its receiving end through terminal 104 which is threaded into the machine frame. The inner conductor of the transmission line is connected to one end of a coil 105 through a terminal 106 which is supported on an insulating plate 107, secured to the under side of the machine bed 10. The load circuit elements comprising coil 108, condenser 109 and electrodes 60 and 70, between which the work is disposed, are connected in series with each other. This load circuit is connected in shunt across the coil 105 and may be traced as follows: from the inner conductor 103 of the transmission line at the terminal 106, through the coil 108, through variable condenser 109, thence through conductor 110 to the electrode 70, work M, electrode 60, and thence through the machine frame to the outer conductor 99, of the transmission line.

In changing from one type of dielectric material to another, or in changing from one thickness of material to another thickness, it is sometimes necessary to readjust the condenser 109 to compensate for the change in the capacitive component of the load. To provide for the adjustment of the condenser from above the bed-plate 10, I have attached the lower end of a cylindrical piece of polystyrene 112 to the rotor of the condenser 109, and to the other end I have secured a set-screw 113. The screw 113 extends through a suitable opening in the bed 10 and is thus accessible for adjustment from above the bed-plate 10. To visually inform the operator that the load circuit has been properly adjusted to resonance with the oscillator frequency, a glow lamp 114 has been provided. The lamp 114 is located in the space between the bed 10 and the insulating plate 107, and has one of its terminals electrically connected by a conductor 115 to the terminal 106. A lens 116 is fitted in a suitable opening in the bed-plate 10 and is located above the lamp 114. With this arrangement, the condenser 109 may be adjusted from above the bed and is insulated therefrom. When the load circuit is properly tuned, the lamp 114 will reach its maximum brilliance, the brilliance of the lamp being under observation at all times through the lens 116.

The thickness and loss factor of the material determine the rate of feed of the material through the machine. As previously described, the end of the bell-crank lever 35 extends between the spaced cams 37 and 38 and it is obvious that by turning the cam 37 by means of the hand knob 41 the position of the spring biased lever 35 can be accurately determined. As the position of the lever 35 determines the rate of feed of the material it is apparent that the machine may be easily and quickly set for a given material of known thickness.

In bonding sheet material cross-seams are often encountered. When this occurs there is a sudden increase in the thickness of material between the electrodes and it becomes necessary to reduce quickly the rate of feed of the material. In order to predetermine the reduced rate of feed the cam 38, which is adjustable by the knob 42, is provided. The cam 38 is, in effect, an adjustable stop which the end of the lever 35 is adapted to engage when the lever 35 is pulled downwardly by means of a chain 117. This chain has one of its ends connected to the lever 35 and its other end connected to a treadle (not shown). From the above it will be understood that when a cross-seam is encountered the operator pulls downwardly on the chain 117. This swings the lever 35, in opposition to the spring 101, about its pivot 36 until the end of the lever engages the periphery of the cam 38. When the lever 35 is in this position the feed-wheel 20 will advance the material at a predetermined reduced rate.

The foregoing description discloses what I deem to be a practical and efficient embodiment of the invention, and it should be understood that changes made in the arrangement, disposition and form of the parts may be varied without departing from the principles of the present invention as comprehended within the spirit and scope of the appended claims.

Having thus set forth the nature of the invention, what I claim herein is:

1. A machine for bonding together plies of dielectric material comprising a frame; feed-wheels carried by said frame; electrodes carried by said frame; mechanism for reciprocating one of said electrodes, means for supplying a high frequency electric current to said electrodes, mechanism for actuating said feed-wheels to cause them intermittently to advance dielectric material between said electrodes, and means for varying the action of said feed-wheels to control the rate of feed of the material between said electrodes, at the will of the operator and during the operation of the machine.

2. A machine for bonding together plies of dielectric material comprising a frame, feed-wheels carried by said frame, opposed electrodes carried by said frame, means for supplying a high frequency electric current to said electrodes, mechanism for imparting a step by step movement to said feed-wheels to cause them to advance dielectric material intermittently between said electrodes, and manual control means under control of the operator during the operation of the machine for varying the amplitude of feeding movement imparted to the feed-wheels.

3. A machine for bonding together plies of dielectric material comprising a frame, electrodes carried by said frame and providing a bonding zone, means for supplying a high frequency electric current to said electrodes, mechanism for relatively reciprocating said electrodes, a rotary driving shaft journaled in said frame, a feed-shaft, a feed-wheel carried by said feed-shaft, a one-way clutch secured to said feed-shaft, mechanism operatively connecting said clutch and said main shaft, and means operable during the operation of the machine for changing the position of some of said mechanism to vary the amount of movement imparted to the feed-shaft during one rotation of the driving shaft.

4. A machine for bonding together plies of dielectric material comprising a frame, opposed electrodes carried thereby, means for supplying a high frequency current to said electrodes to provide a bonding zone therebetween, means for relatively reciprocating said electrodes, mechanism for intermittently feeding material through said bonding zone, a lever pivoted to said frame and operatively connected to said feeding means to vary the effective work feeding movements of said feeding means, and spaced adjustable stop means for limiting the movement of said lever.

5. In a machine for bonding together plies of material, a main shaft, a pair of electrodes, means for supplying a high frequency electric current to said electrodes, means for moving one of said electrodes into and out of engagement with the material, feeding mechanism for advancing the material, mechanism actuated by said main shaft for imparting an intermittent feeding motion to said feeding mechanism, said mechanism including a lever for regulating the amplitude of motion imparted to the feeding mechanism, means for predetermining the amplitude of movement of said lever comprising spaced cam members between which said lever extends, and means for adjusting the positions of said cams independently of each other.

6. In a machine for bonding together plies of dielectric material, an upper and a lower electrode, means for supplying a high frequency current to said electrodes, mechanism for reciprocating said upper electrode towards and from the lower electrode, feeding means comprising upper and lower material advancing members, said upper member being spring urged towards said lower member, and a single manually controlled means for simultaneously raising said electrode and said upper material advancing member.

7. In a machine for bonding together plies of dielectric material, electrodes adapted to receive dielectric material therebetween, means for supplying a high frequency current to said electrodes, a pair of feed-wheels for advancing the material between said electrodes, said feed-wheels being located on the opposite sides of the material to be bonded, means for spring urging one of said feed-wheels towards the other of said feed-wheels, mechanism for reciprocating one of said electrodes towards and from the other electrode, and manual means under control of the operator for simultaneously moving said last mentioned electrode and said spring urged feed-wheel out of engagement with the material.

8. In a machine of the class described, electrodes disposed with respect to each other to provide a bonding zone, spring opposed means for intermittently separating said electrodes, means for supplying a high frequency electric current to said electrodes, feed-wheels for advancing materials through said bonding zones, means for intermittently rotating one of said feed-wheels, adjustable means for predetermining different amplitudes of feed, and means operable at will during the operation of the machine for changing the amplitude of the intermittent work-advancing movements imparted to said feed-wheels.

HANS HACKLANDER.

REFERENCES CITED

The following references are of record in the file of this patent:

UNITED STATES PATENTS

| Number | Name | Date |
|---|---|---|
| 660,617 | Bissinger | Oct. 30, 1900 |
| 802,672 | Wever et al. | Oct. 24, 1905 |
| 1,800,487 | Valentine | Apr. 14, 1931 |
| 1,097,864 | Knopf et al. | May 26, 1914 |
| 2,322,298 | Johnston | June 22, 1943 |
| 2,343,975 | Hosfield | Mar. 14, 1944 |

OTHER REFERENCES

Scientific American Publication of July 1943 entitled "High-Frequency Seaming." (Page 26.)